United States Patent

Schoonover et al.

[15] 3,694,970
[45] Oct. 3, 1972

[54] OFFSET SIZE ADJUSTMENT CIRCUIT FOR GRINDING MACHINES

[72] Inventors: Stanley C. Schoonover, Waynesboro; Lester R. Luckenbach, Mont Alto, both of Pa.

[73] Assignee: Litton Industries, Inc., Beverly Hills, Calif.

[22] Filed: Sept. 18, 1970

[21] Appl. No.: 73,331

[52] U.S. Cl..............................51/165.71, 51/165.91
[51] Int. Cl. ..............................................B24b 49/06
[58] Field of Search...51/165 R, 165 TP, 165.71, 165.74, 51/165.75, 165.76, 165.77, 165.8, 165.9, 165.91, 165.92

[56] References Cited

UNITED STATES PATENTS

| | | |
|---|---|---|
| 3,157,971 | 11/1964 | Snyder.....................51/165.91 |
| 3,466,976 | 9/1969 | Price..........................51/165 R |
| 3,557,495 | 1/1971 | Price ........................51/165.8 |

*Primary Examiner*—Harold D. Whitehead
*Attorney*—Diller, Brown, Ramik & Holt

[57] ABSTRACT

An automatic machine, which includes a gage mechanism, for grinding workpieces having axially spaced portions of different diameters is disclosed. The gage mechanism, which is used to determine the diameter of each workpiece portion to assure that the workpiece is within certain tolerances, includes a workpiece engaging element or caliper of the chordal type which supplies a signal, indicative of the sensed diameter of a workpiece portion, to a summing network. The summing network also receives a signal from a digital to analog converter arranged to convert a digital signal from a card reader into an analog signal indicative of a desired diameter of a workpiece portion. An analog size offset circuit is arranged to supply an offset signal to the digital to analog converter. The offset circuit provides, in addition to a settable common offset signal, an additional programmed offset signal which is derived from a second analog to digital converter supplied with digital signals from thumbwheel switches which receive enabling signals from a program sequence controller. The controller also supplies enabling signals to the card reader associated with the first-mentioned digital to analog converter.

21 Claims, 10 Drawing Figures

PATENTED OCT 3 1972

INVENTORS
STANLEY C. SCHOONOVER
& LESTER R. LUCKENBACH

By
*Diller, Brown, Ramik & Wight*
ATTORNEYS

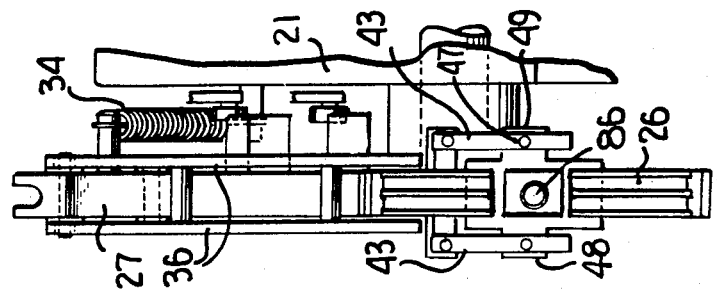
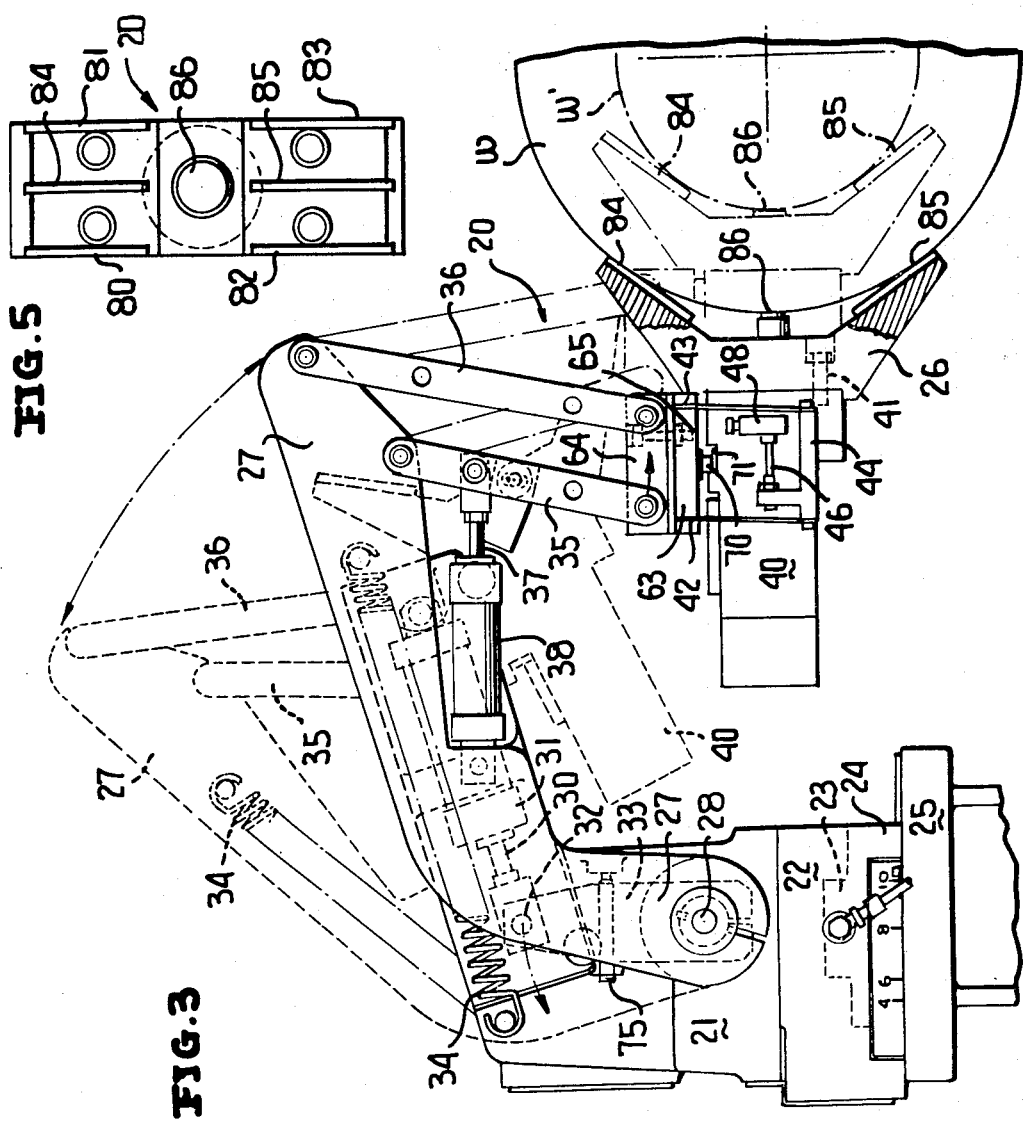

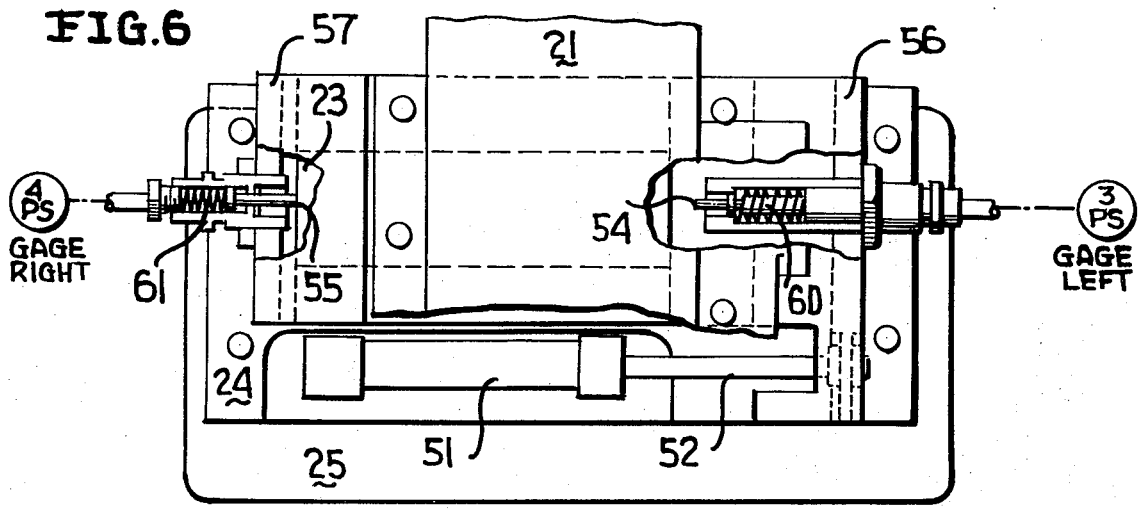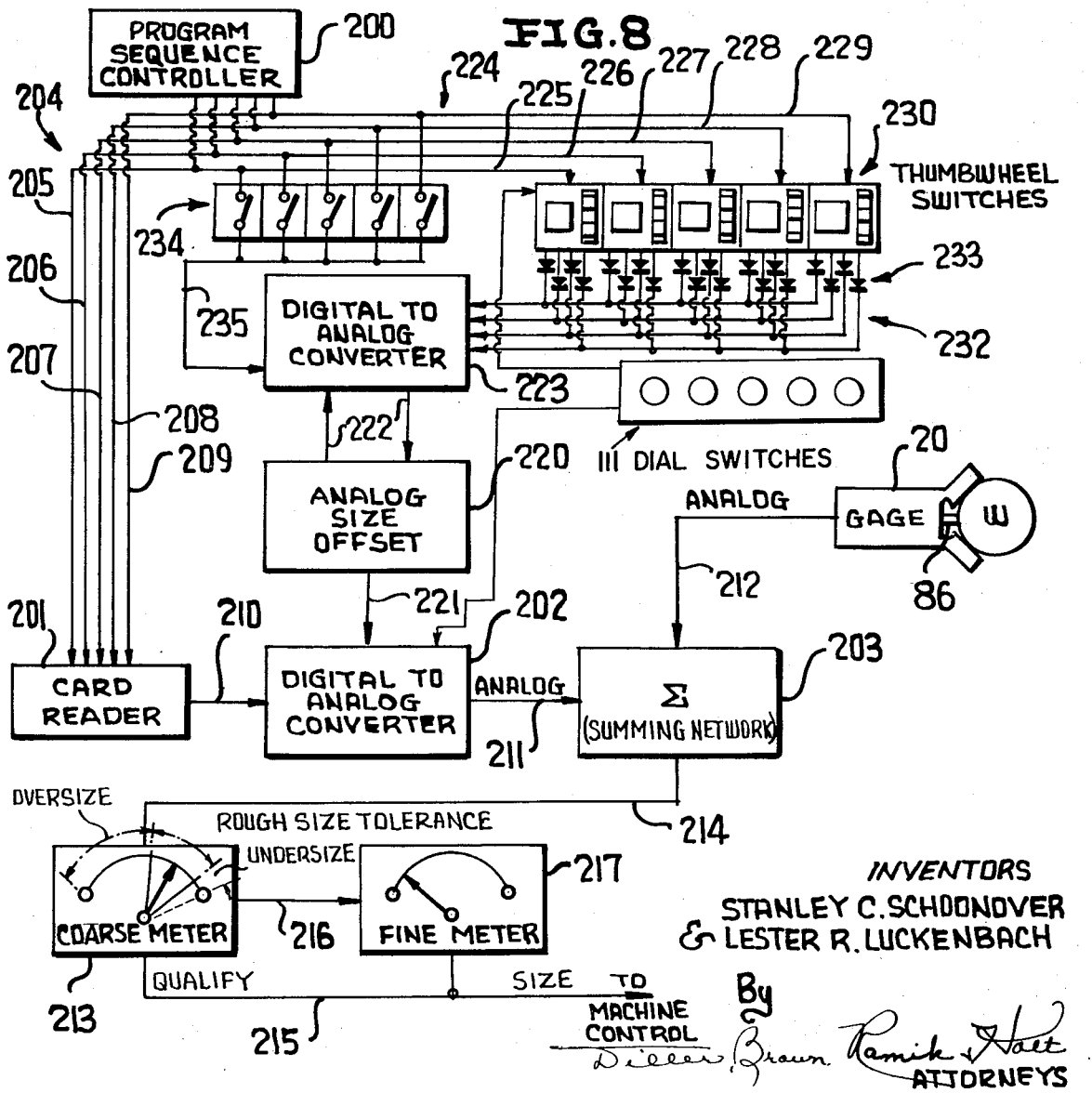

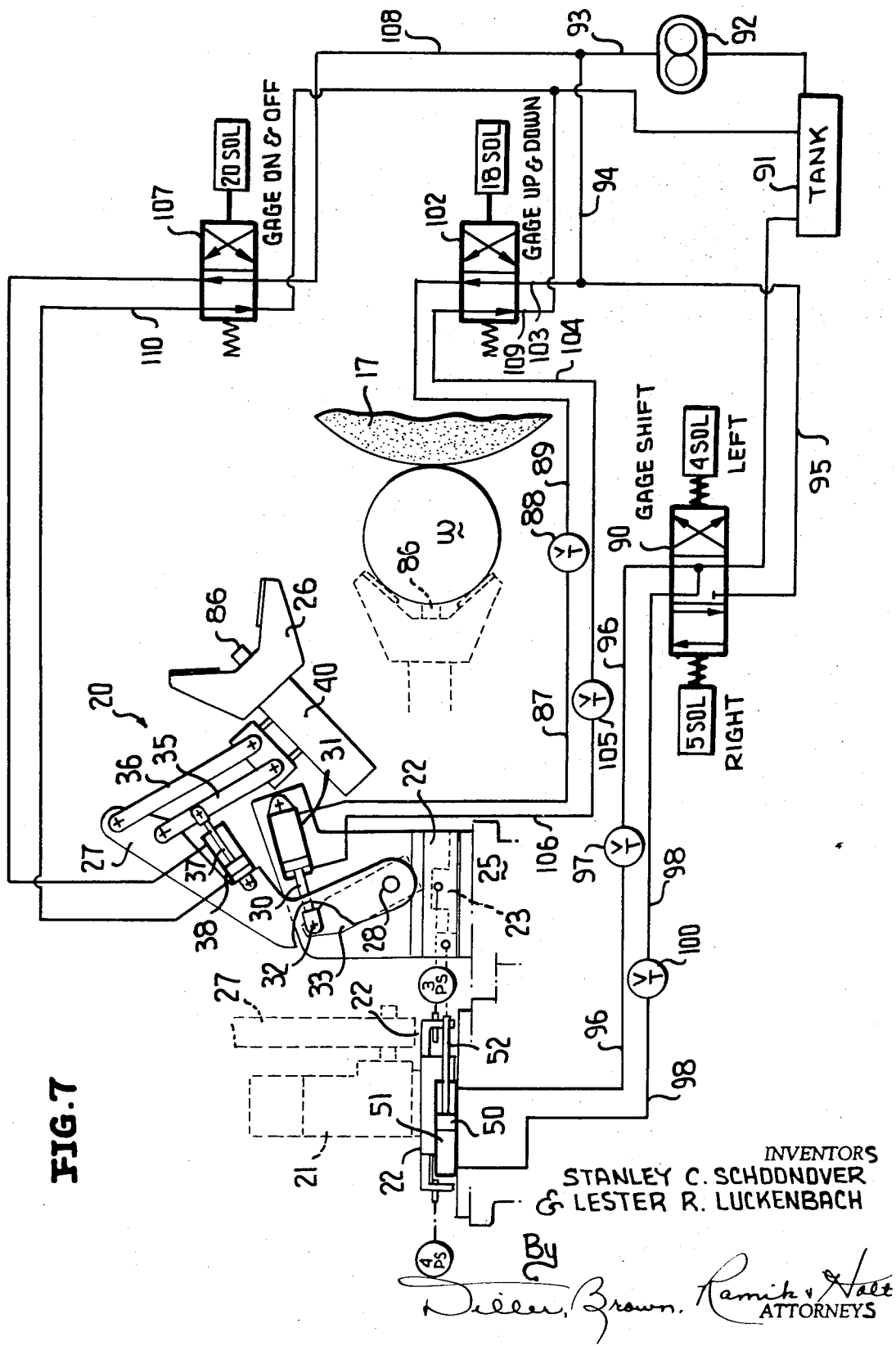

OFFSET SIZE ADJUSTMENT CIRCUIT FOR GRINDING MACHINES

This invention relates, in general, to new and useful improvements in automatic machine tools, particularly grinding machines for grinding workpieces having axially spaced portions of different diameter sizes. More particularly, the invention relates to grinding machines which include a transducer or gaging probe of a chordal-type caliper gage. An offset switching arrangement automatically provides a predetermined amount of oversize from the nominal programmed size for each diameter during the first automatic cycle of operation. Thumbwheel switches provide manual control adjustments for minor size variations for each diameter or station of the workpiece to compensate for an undersize or an oversize direction of adjustment.

Prior to this invention, a single offset dial control member was utilized to provide means for varying the size of each workpiece diameter during a set-up operation by a predetermined amount, before the semi-automatic or automatic grinding operation. However, the only method of providing a size variation for a particular diameter was to alter the programmed dimension by changing a decade dial which was furnished for each numeral to alter selectively each of the programmed dimensions.

It has been also known, in grinding machines which utilize card readers to establish programmed dimensions, to provide a special set-up card which provided for a given amount of oversize for each diameter during the first automatic grinding cycle. In this particular prior art arrangement, it was not possible to vary the size for each particular diameter without altering the programmed card or providing card or providing a new programmed card.

The primary object of this invention is to provide an offset means to compensate for resulting errors between the programmed size and the actual measurement of each workpiece portion.

Another object of this invention is to provide an offset means to correct any existing patterns of size irregularities which are undesirable.

A further object of this invention is to provide an offset means to compensate for workpiece variations caused by irregular size control or the flexible properties of a workpiece.

Yet another object of this invention is to provide an offset means to correct for minor workpiece changes without altering a programmed card or providing a new programmed card.

Yet a further object of this invention is to provide a circuit for producing offset signals in accordance with a program.

Still another object of this invention is to provide a circuit for producing offset signals in accordance with a program and for producing a base offset signal which may be combined with the offset signals which are programmed.

With the above and other objects in view, as will hereinafter appear, the nature and features of the invention will be more clearly understood by reference to the following detailed description, the appended claims, and the several views illustrated in the accompanying drawings in which like reference characters designate like parts.

IN THE DRAWINGS:

FIG. 3 is an enlarged fragmentary side elevational view of the gage mechanism, and illustrates a suitable linkage arrangement and actuating means for advancing the caliper against the workpiece with the axis of the probe in a near horizontal line close to or passing through the center line of the workpiece so that upper and lower shoes of the gage engage the workpiece with equal force.

FIG. 4 is a fragmentary end view of the gage mechanism of FIG. 3 looking from right-to-left, and more clearly illustrates portions of the linkage arrangement.

FIG. 5 is an end view of the face of the gage of FIGS. 3 and 4, and more clearly illustrates the details of the upper and lower shoes and the probe therebetween.

FIG. 6 is a fragmentary top plan view of a gage mounting and locating mechanism, and the association thereof with a pair of switches forming a portion of the circuitry of FIG. 9.

FIG. 8 is a highly schematic view of the gage mechanism, the mounting thereof, and a hydraulic system for imparting movement to the gage mechanism incidental to a gaging operation.

FIG. 8 is a block and partially schematic diagram of the electronic circuit of the present invention, including offset means, for controlling the grinding cycle of the grinding machine in accordance with the unground dimension of a work portion in position for grinding.

Figure 1:
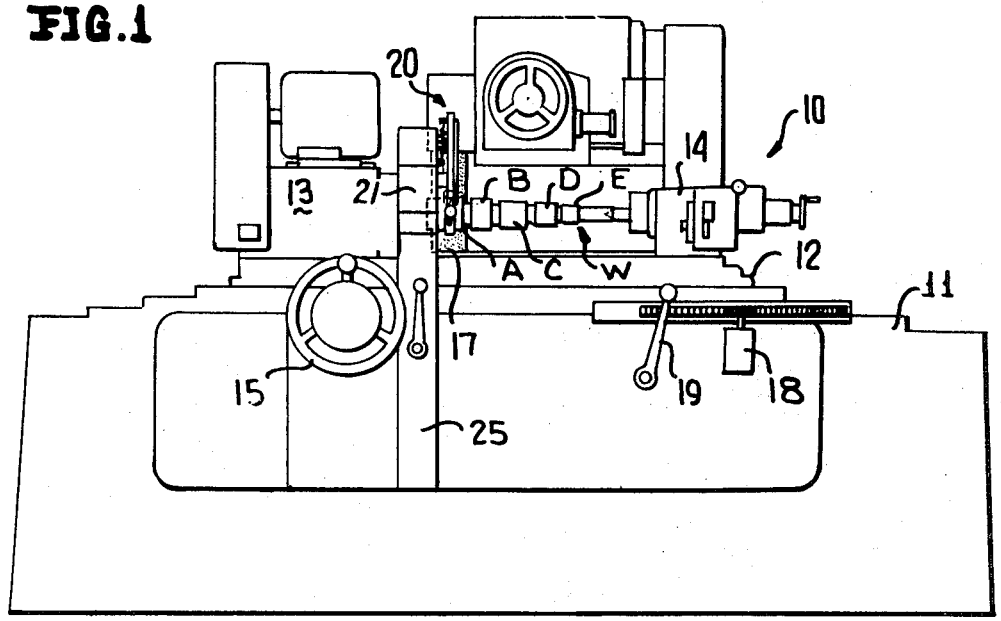
FIG. 1 is a front elevational view of a grinding machine, and illustrates a gage mechanism positioned adjacent a large diameter portion of a multidiameter workpiece.
Figure 2:
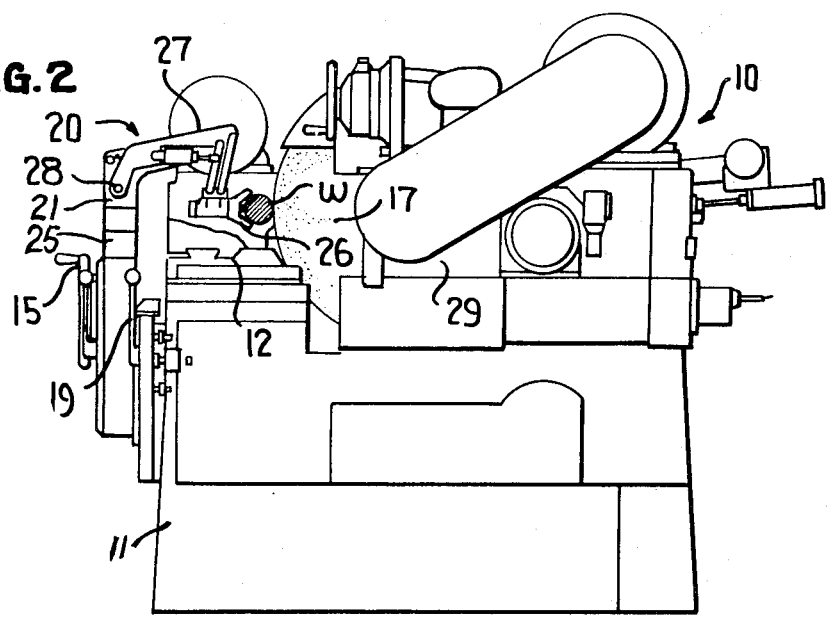
FIG. 2 is an end elevational view of the grinding machine of FIG. 1, and shows a chordal type caliper of the gage mechanism in contact with the workpiece.

Referring first to FIGS. 1 and 2, a workpiece W having portions A through E of different diameters is mounted between a headstock 13 and a tailstock 14 of an automatic grinding machine 10 which is of a conventional construction and includes a conventional bed 11.

The bed 11 has mounted thereon, in a conventional manner for longitudinal sliding movement, a work carriage or support 12. The headstock 13 is mounted at one end of the support 12 and includes a conventional drive (not illustrated) to rotate the workpiece W. The tailstock 14 is mounted on the opposite end of the support 12, as is clearly illustrated in FIG. 1. The workpiece W is rotated by the headstock 13 about a predetermined axis and is shifted longitudinally with the support 12 in a conventional manner. For the purpose of illustration, longitudinal shifting of the support 12 may be effected by a hand wheel 15. It is to be understood, however, that support 12 may be shifted by different means such as, for example, a drive device under the control of a program sequence controller 200.

A punch card (not shown) housed in a conventional card reader 201 (FIG. 8) provides a signal to position the selected portion of the workpiece W which is to be ground, during a particular period of a grinding cycle, longitudinally of the grinding wheel 17, as will be described more fully hereinafter. As the support 12 is shifted longitudinally a transducer 18, driven by the support 12, provides a signal when each portion of the workpiece W which is to be ground is in the correct longitudinal position for grinding in alignment with the grinding wheel 17. As shown in FIGS. 1 and 2, the portion A of the workpiece W is in alignment with the grinding wheel 17 and with a gage mechanism generally designated by the reference numeral 20.

Reference is now made additionally to FIGS. 3, 6, 7 and 9 which illustrate the manner in which the gage mechanism 20 is supported adjacent the grinding wheel 17 for movement between the solid and phantom positions shown in FIG. 3. The gaging mechanism 20 is supported by a base member 21 which is secured to a table 22, the latter of which is best illustrated in FIGS. 3 and 6. The table 22 is in turn slidably mounted on a table slide 23 which is secured to a subbase 24. The subbase 24 is secured to a pedestal 25 which is mounted to the front of the bed 11, as is best illustrated in FIG. 1. The subbase 24 is adjustable to position the gage mechanism 20 for the maximum diameter to be ground which controls the transverse movement of a workpiece engaging chordal type caliper 26.

The base member 21 supports a gage arm 27 which is pivotally mounted about a pivot 28. The lowering of the arm 27 moves the caliper 26 into a lower position which will permit the caliper 26 to be advanced against the workpiece W, as indicated in phantom outline in FIG. 7, so as to sense the diameter thereof.

Movement of the arm 27 is effected by a piston rod 30 within a hydraulic motor or cylinder 31 for raising or lowering the caliper 26. The hydraulic motor 31 is mounted within the base member 21, as best shown in FIGS. 3 and 7, and the piston rod 30 thereof is secured at a point 32 to an arm 33 which is in turn connected at the pivot 28 to the lower end of the arm 27. A coil spring 34, which is best illustrated in FIG. 3, connects the base member 21 to an inner portion of the gage arm 27 to provide means to raise the caliper 26 should a power failure occur during a grinding operation.

The arm 27 supports the caliper 26 by means of two arms 35, 36, the latter of which is longer than the former. The arms 35 and 36 are equally spaced along their lengths, but, do not form a parallelogram because of the longer length of the arm 36 noted heretofore which provides near horizontal movement of the caliper 26 when a piston rod 37 within a hydraulic motor or cylinder 38 is advanced to the right as viewed in FIGS. 3 and 7.

The caliper 26 is secured to a transducer housing 40 by screws 41 in a conventional manner, as is best shown in FIG. 3. The housing 40 is supported by vertical leaf springs 42 and 43 which are secured to support members 44 at opposite sides of the housing 40. The support members 44 and 45 are connected to the housing 40 through alignment rods 46 and 47 which are in threaded engagement with said support members and lugs 48 and 49 which project from respective sides of the housing 40.

Reference is now made to FIGS. 6 and 7 which illustrate the manner in which the gage mechanism 20 is controlled in response to a punch card (not illustrated) to effect movement of the arm 27 and the caliper 26 carried thereby toward the workpiece W. The latter-mentioned means includes a piston 50 within a hydraulic cylinder 51, the latter of which is secured to the subbase 24 and includes a piston rod 52 which is secured to an extension (unnumbered) of the slidably mounted table 22 which carries the gage base member 21.

Air valves 54 and 55 (FIG. 6) are secured to table brackets 56 and 57, respectively, so that movement of the base member 21 to the right or left by movement of the piston rod 52 effects the closing of conventional pressure switches 3PS or 4PS (FIG. 6) by reduced air pressure.

The air valve 54 is open when the base member 21 is positioned to the left as the table slide 23 secured to the subbase 24 depresses a spring 60. The air valve 55 is opened when the base member 21 is positioned to the right by the slide 23 depressing a spring 61. The air valves 54 and 55 energize the pressure switches 3PS and 4PS by reduced pressure in a conventional manner to provide a signal to permit an operational cycle to start when the base member 21 and the caliper 26 are in the correct longitudinal position for measuring the unground portion of the workpiece W.

The upper end of the leaf springs 42, 43 are secured to a lower swivel plate 63 which is secured to an upper swivel plate 64 by a threaded screw and swivel pin 65 (FIG. 3). The plate 64 is secured to the pivotal arms 35, 36 so that movement of the arm 27 by the motor 31 in the manner heretofore described or movement of the piston rod 37 effects movement of the caliper 26. Fine horizontal adjustment of the caliper 26 is obtained from an eccentric member 70 locked in the swivel plate 63. Turning of the member 70 advances or retracts the caliper 26 a small amount as a notch 71 is provided in the housing 40 which is held against the eccentric member 70 by tension of the leaf springs 42, 43.

Fine vertical adjustment of the caliper 26 may be made by adjusting a set screw 75 (FIG. 3) to increase or restrict the forward movement of the arm 27 when the caliper 26 is lowered by the hydraulic motor 31.

Adjustment of the alignment rods 46, 47 will permit any out of squareness to be corrected so that the side of caliper 26 is normal to the axis of the workpiece W.

Reference is now made to FIG. 5 which illustrates the caliper 26 including outer shoe portions 80 through 83 on the outer edges of the gage 20 which are ground to a dimension slightly under the center shoe portions 84, 85. This arrangement enables the outer shoe portions 80 through 83 to be used only for checking the longitudinal position of the workpiece while the center shoe portions 84, 85 contact the workpiece for positioning a probe 86 with its center line passing through the axis of the workpiece W (not shown in FIG. 5) or close thereto, as shown relative to two different diametered workpiece portions in FIG. 3. The outer shoe portions 80 through 83 would contact a shoulder formed by a larger diameter when the workpiece W is not correctly positioned with comparison to the programmed location.

The center shoe portions 84, 85 of the gage contact the workpiece W at points formed by a specific angle of 106°, 15 minutes and 36 seconds which provides an 8 to 1 ratio in amplification by the gage sensing element or probe 86.

Turning now to the electronic circuit illustrated in FIG. 8, a program sequence controller 200 is provided for producing a plurality of enable signals which are coupled to the card reader 201 by wiring indicated generally by the numeral 204. Output digital signals from the card reader 201 are coupled to a digital to analog converter 202 via a wiring 210. The digital to analog converter 202 produces an analog signal which is coupled, via a lead 211, to a conventional summing network 203 which also receives an analog signal from the gage 20 via a lead 212.

The output from the summing network 203 is coupled to a coarse meter 213 by a lead 214. The coarse meter 213 is arranged to produce a signal on an output wiring 215 to indicate whether or not a portion of the workpiece W which is in engagement with the probe 86 is within the rough size tolerance and thereby qualifying to be ground. An output from the coarse meter 213 is also fed via a lead 216 to a fine meter 217 which, in turn, supplies an output to the wiring 215 which indicates that a portion of the workpiece W in contact with the probe 86 has reached the desired final size.

The coarse meter 213 and the fine meter 217 also provide respectively visual indications of the size of that portion of the workpiece which is in contact with the probe 86 during the qualifying and final size portions of an operational cycle, respectively.

As thus far described, the circuit of FIG. 8 produced signals on the wiring 215 in response to the programmed size, as determined solely by the card reader 201, and the actual measurement of each workpiece diameter, as determined by the position of the probe 86. The remainder of the circuit, yet to be described, illustrated in FIG. 8 is arranged to provide for a programmed offset to compensate for possible errors between the programmed size and the actual measurement of each workpiece W diameter and, if desired, to provide means for correcting patterns of size irregularities and making minor size adjustments without changing the card in the card reader 201.

In addition to receiving digital signals from the card reader 201, the digital to analog converter 202 receives an analog size offset signal from an analog size offset circuit 220, via a wire 221. An input to the analog size offset circuit 220 is provided by 222 from a second digital to analog converter 223.

Figure 10:
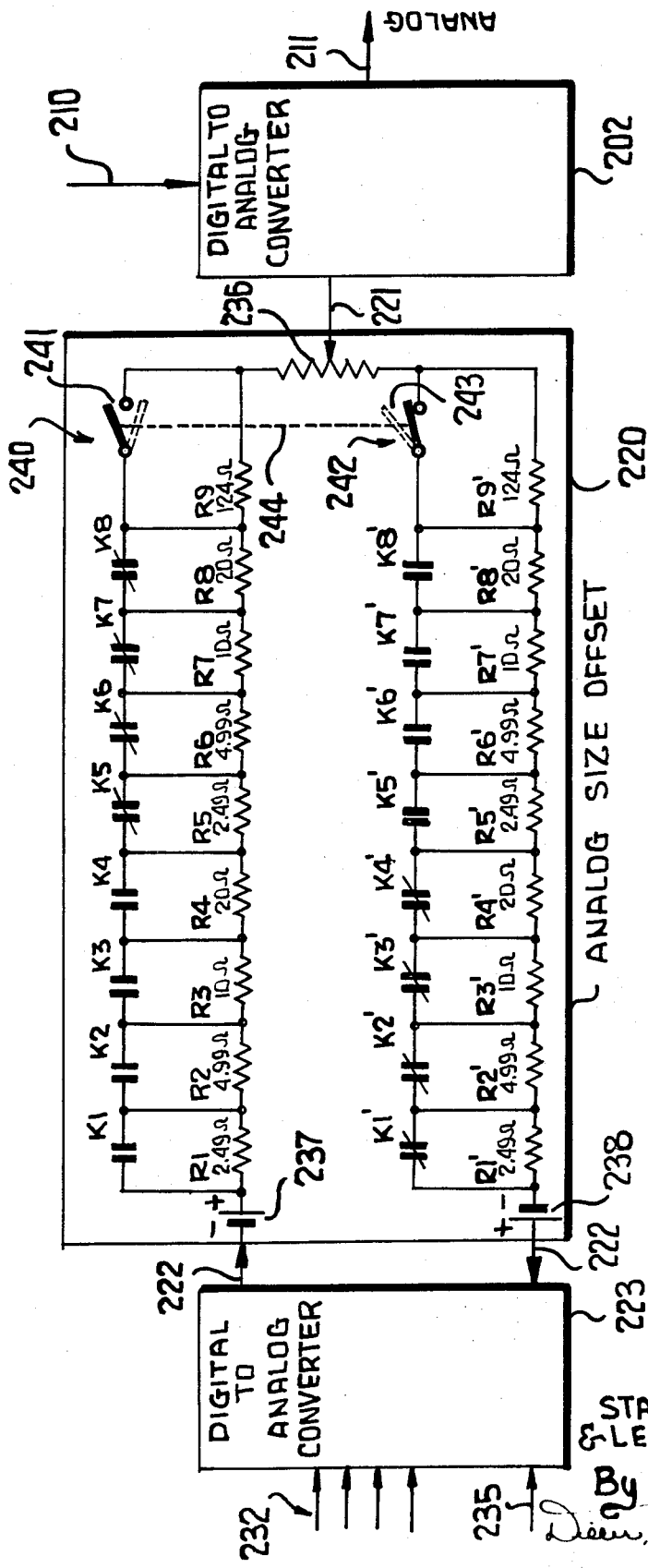
FIG. 10 is a block and partially schematic diagram of an illustrative embodiment of an analog offset circuit suitable for use in the electronic circuit illustrated in FIG. 8, and shows details of its connection thereto.

The details of a particular analog size offset circuit which may be used for the analog size offset circuit 220, as well as the connections thereof to the digital to analog converters 202 and 223, is illustrated in FIG. 10 which is described in detail hereinafter.

The program sequence controller 200, in addition to supplying enabling signals to the card reader 201 supplies enabling signals to a wiring generally designated by the numeral 224 which, as illustrated, consists of five leads 225–229 which are connected respectively in parallel with the leads 205–209 of the wiring 204. The leads 225–229 are individually connected to one of five thumbwheel switches generally designated by the numeral 230. Each of the thumbwheel switches 230 is provided with a plurality of contacts (not illustrated) which may be set by the thumbwheels of the thumbwheel switches in accordance with the desires of an operator to provide programmed offset signals in digital form to a wiring 232. As will be readily apparent to those skilled in the art, individual contacts (not illustrated) within each of the thumbwheel switches 230 selectively pass enabling signals, which may appear on the leads 225–229, the individual leads of the wiring 232 via isolating diodes, generally illustrated by the numeral 233. The individual contacts (not illustrated) within each of the thumbwheel switches 230, depending on the setting of the thumbwheels chosen by the operator, instead of passing the enabling signal may establish a reference potential on selected ones of the contacts (not illustrated) within the thumbwheel switches. The enabling signals, which are passed to individual leads of the wiring 232 establish a high (1) condition on selected ones of the leads constituting the wiring 232 while other leads are maintained at a low (0) condition thereby providing the digital input from the wiring 232 to the digital to analog converter 223. Thus, each of the thumbwheel switches 230 individually establish a particular offset for respective diameters of the workpiece W so far as the amount of programmed offset is concerned.

Each of the leads 225–229, forming part of the wiring 224, is connected to an individual one of a plurality of single-pole single-throw switches designated generally by the numeral 234 which are connected via a lead 235 to the digital to analog converter 223. As shown, each of the single-pole single-throw switches 234 is shown in an open position. In such a position, no enabling signal is passed to the lead 235, and the digital to analog converter 223 provides an analog output signal on the wiring 222 of a particular polarity in accordance with the digital input provided from the wiring 232.

In the event an operator wishes to provide a programmed negative offset signal, as opposed to a programmed positive offset signal, for one or the other of the workpiece portions of the workpiece W, he may simply close one of the switches 234 thereby establishing on the lead 235 a signal for reversing the output of the digital to analog converter 223 by passing an enabling signal to the lead 235 from a selected one of the leads 225–229. As can be seen from the foregoing, the output from the digital to analog converter 202 maybe modified in accordance with an output from the analog size offset circuit 220 which, in turn, receives programmed offset signals from the digital to analog converter 223 which may vary in magnitude in accordance with the setting of the thumbwheel switches 230 and in polarity independent from the setting of individual switches of the single-pole, single-throw switches 234.

Referring now the the circuit of FIG. 10, the digital to analog converter 223, the analog size offset circuit 220 and the digital to analog converter 202, which are also illustrated in FIG. 8, are shown. The internal construction of a particular analog size offset circuit 220 which may be used in practicing the present invention is shown in detail. The analog size offset circuit 220 includes a potentiometer 236 having a first end connected to a plurality of series connected precision resistors R1–R9. A second end of the potentiometer 236 is similarly connected to a second plurality of series connected precision resistors R1'–R9'. Exemplary ohmic values for each of the precision resistors R1–R9 and R1'–R9' are shown in FIG. 10. The ohmic value of the precision resistor R1, as can be seen from FIG. 10, is the same as the ohmic value of the resistor R1'. The specific ohmic value of each of the precision resistors R2–R9 correspond respectively to the ohmic values of the precision resistors R2'–R9'.

A first fixed voltage source 237 of a given polarity is connected in series between the precision resistor R1 and one of the leads forming the wiring 222 from the digital to analog converter 223. An oppositely poled fixed voltage source 238 is series connected between the precision resistor R1' and the other lead of the wiring 222 from the digital to analog converter 223.

A switch 240, having a contact 241 connected across the precision resistor R9, and a switch 242, having a contact 243 connected across the precision resistor R9', are provided. The switches 240 and 242 are ganged together as indicated by a broken line 244. As shown, the contact 241 is open thereby placing the precision resistor R9 in circuit and the contact 243 is closed thereby short circuiting the precision resistor R9' so as to provide a common offset signal which is coupled to the digital to analog converter 202 via the wire 221. The signal on the wire 221 is added to the output from the digital to analog converter 202 which receives a digital input from the wiring 210 so as to modify the analog output appearing on the lead 211.

Each of the precision resistors R1–R8 is provided respectively with a contact K1–K8 connected in parallel therewith. Similarly, each of the precision resistors R1'–R8 is provided respectively with a contact K1'–K8 connected in parallel therewith. A first two-pole toggle switch (not illustrated) is provided for simultaneously opening the contact K1 while closing the contact K1' and, conversely, for simultaneously opening the contact K1' and closing the contact K1. A second two-pole toggle switch (not illustrated) is provided for opening and closing the contacts K2 and K2'. Each of the pairs of contacts K3–K3' through contacts K8–K8' is provided with a similar toggle switch (not illustrated) for opening and closing said contacts. As shown in FIG. 10, contacts K1–K4 and contacts K5'–K8 are shown in an open condition while corresponding contacts are shown in a closed condition. Since the values of the precision resistors R1–R4 correspond respectively to the values of the precision resistors R5'–R8', the only offset provided by the analog size offset circuit in the condition shown, is provided by the fact that the precision resistor R9 is in circuit while the precision resistor R9' has been short circuited. In the event an operator wishes to add further common offset, he need simply to open a selected one of the additional contacts K5–K8 while closing the corresponding contacts K5'–K8' by selectively setting one or the other of the toggle switches (not illustrated) associated with the selected pair of contacts. Similarly, if an operator wishes to reduce the amount of offset provided by simply short circuiting the resistor R9', he may open additional ones of the contacts K1'–K4' while simultaneously closing additional ones of the contacts K1–K4. It will be appreciated by those skilled in the art, that by simultaneously adding and subtracting resistances from the two arms of the analog size offset circuit, 220 the value of the total resistance provided by the precision resistors R1–R8 and R1'–R8' remains unchanged.

OPERATION

Figure 9:
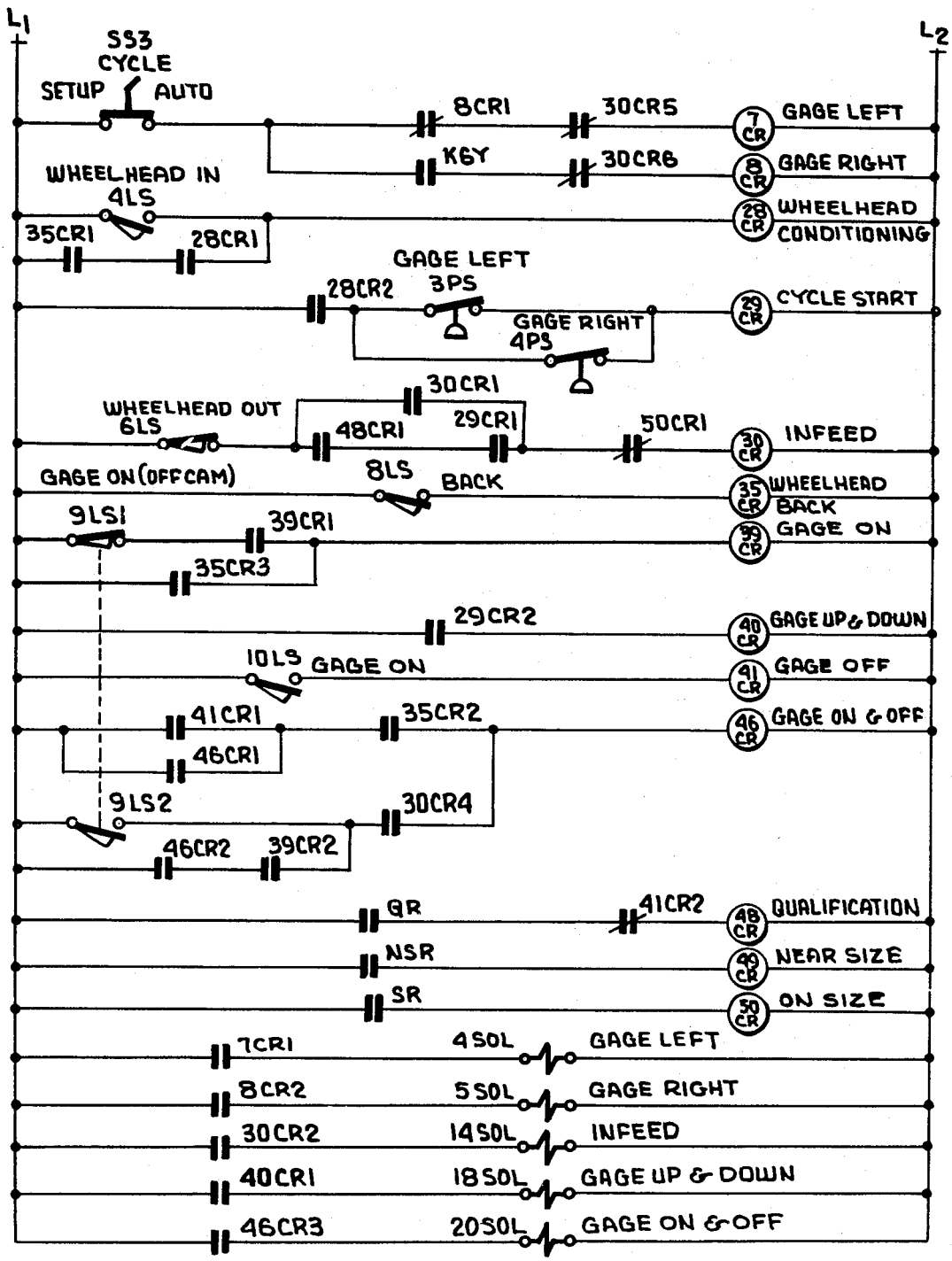
FIG. 9 is a schematic view of an electrical circuit operable in cooperation with the gaging mechanism and the circuit illustrated in FIG. 8 for controlling the grinding cycle.

The operation of the grinding machine 10 and particularly the electronic circuit illustrated in FIG. 8 will now be described with particular reference to the circuitry of FIGS. 9 and 10.

In order to place the circuit of FIG. 8 in readiness for operating the grinding machine 10 of the present invention, a programmed card which includes instructions for the specific size of the five diameters of the workpiece portions A–E is placed within the card reader 201. The thumbwheel switches 230 are each positioned so as to provide all low signals (0) to each of the leads constituting the wiring 232. Each of the switches 234 is set in an open position, as shown in FIG. 8.

With the thumbwheel switches 230 offset to provide low (0) signal condition on each of the leads forming the wiring 232, the digital to analog converter 223 has a zero output and no current attributable to an analog signal from the digital to analog converter 223 flows through the wiring 222. As thus far described, the circuit of FIG. 8 will not provide any programmed input to the analog size offset circuit 220.

Referring now to FIG. 10, the switches 240 and 242 are initially positioned so that both are open, as illustrated by the broken lines associated respectively with the contacts 241 and 243. In such a position, the movable contact associated with the potentiometer 236 is adjusted so that a zero output appears on the wire 221. The switches 240 and 242 are then moved to the position shown in solid line, thereby closing the contact 243 while maintaining the contact 241 open. It will be appreciated, that in the just-mentioned position, the circuit constituted by the precision resistors R1–R9 and R1'–R9 becomes unbalanced, a greater resistance being associated in that arm constituted by the precision resistors R1–R9. As will be readily understandable to those skilled in the art, a voltage appears on the wire 221 thereby providing a given offset signal to the digital to analog converter 202 which would provide a predictable given oversize for each of the ground diameters. For example, in a practical embodiment the predictable oversize could be 0.005 inch. In many instances, no further adjustment of the analog size offset circuit 220 is needed or desirable.

On the other hand, an operator may modify the common offset provided by the analog size offset circuit 220 by simply either adding or subtracting resistance from the arm of the resistive circuit constituted by the resistors R1–R8 while simultaneously either subtracting or adding corresponding resistors in that arm constituted by the precision resistors R1'–R8'.

It will be appreciated by those skilled in the art that the just-discussed adjustments of the analog size offset circuit 220 will serve to provide a given common offset for each and every diameter portion A–E of a workpiece. As thus far described, the circuitry of the present invention does not provide an offset which takes into account the varying flexural characteristics of a workpiece. In these circumstances, it is likely that different portions A–E of the workpiece W may vary somewhat in actual oversize.

With the workpiece W placed in the machine and with a selector switch SS3 (FIG. 9) set in its closed automatic position, the carriage 12 automatically positions the left-hand portion A of the workpiece W in front of the grinding wheel 17 and the gage mechanism 20 is positioned longitudinally in response to the programmed card in the card reader 201 (FIG. 8).

The gage mechanism 20 is positioned to the left or right to align the caliper 26 with the side of the grinding wheel 17 adjacent the shoulder of a larger diameter portion of the workpiece W through a reset button (not illustrated) as part of the setup operation.

The gage mechanism 20 is positioned to the left unless contact K6Y is closed from the card reader 201 as GAGE LEFT relay 7CR is energized through cycle selector switch SS3 and normally closed contacts 8CR1 and 30CR5. Upon the energization of the GAGE LEFT relay 7CR a contact 7CR1 closes to energize a solenoid 4SOL (FIGS. 7 and 9) which shifts a valve 90 (FIG. 7) to the left. Hydraulic pressure is directed from a tank 91 by a pump 92 to the valve 90 through lines 93, 94 and 95. Pressure line 96 directs pressure from the valve 90 through a throttle valve 97 to the rod end of the hydraulic cylinder 51 (figs. 6 and 7). Piston 50 within the cylinder 51 is moved to the left which positions the base member 21 and the caliper 26 in line with the left edge of the grinding wheel 17, at which point the pressure switch 3PS (FIGS. 6 and 9) is closed by reduced pressure as the air valve 54 is opened in the manner heretofore described. The caliper 26 is positioned to the right when a GAGE RIGHT relay 8CR is energized through the selector switch SS3 when contact K6Y is closed from the card reader 201 and normally closed contacts 30CR6.

Contact 8CR2 closes to energize solenoid 5SOL and shifts the valve 90 (FIG. 7) to the right. Hydraulic pressure from the line 95 through the valve 90 directs hydraulic pressure through a line 98 and through a throttle valve 100 therein to the head end of the cylinder 51.

Piston 50 is moved to the right to effect movement of the base 21 and the caliper 26 in the same direction until pressure switch 4PS (FIGS. 6 and 9) is closed by reduced pressure as air valve 55 is opened.

The infeed lever 19 (FIG. 1) is moved to the advance position to condition the wheel support or wheel head 29 which carries the grinding wheel 17 for infeed movement during the cycle, after the diameter to be ground has been qualified.

Limit switch 4LS is closed from said movement of infeed lever 19 to energize the WHEELHEAD CONDITIONING relay 28CR (FIG. 9) causing contact 28CR1 to close thus providing which is closed as the wheel support or wheel head 29 is in its retracted position.

Contact 28CR2 closes to energize the CYCLE START relay 29CR through GAGE LEFT pressure switch 3PS or GAGE RIGHt pressure switch 4PS, one of which was closed by reduced pressure when he base member 21 and the caliper 26 were longitudinally positioned, in the manner heretofore described.

Contact 29CR1 closes in the circuit with INFEED relay 30CR.

Contact 29CR2 closes to energize the GAGE UP & DOWn relay 40CR to lower the caliper 26 through the mechanism heretofore described. Contact 40CR1 energizes a solenoid 18SOL which shifts valve 102 (FIG. 7) to the left, wherein hydraulic pressure is directed from the pump 92 to said valve 102 through the lines 93, 94 and a line 103. A line 104 directs pressure from the valve 102 through a throttle valve 105 and a line 106 to the rod end of the cylinder 31. This causes the piston rod 30 to move to the right, as viewed in FIG. 7, to pivot the arm 33 clockwise. Arm 27 likewise pivots clockwise and downwardly as piston rod 30 moves to the right, which lowers the caliper 26 to generally the phantom outline position shown in FIG. 7, although spaced leftward from the workpiece W. Hydraulic fluid is discharged from the head end of the cylinder 31 through line 87, throttle valve 88, line 89, valve 102 and return line 109 to the tank 91.

GAGE ON limit switch 10LS is closed when the caliper 26 is lowered to energize GAGE OFF relay 41CR.

Upon the energization of the GAGE OFF relay 41CR, the contact 41CR1 is closed which completes a circuit to energize GAGE ON & OFF relay 46CR through contact 35CR2 which was closed when the wheel support or wheel head 29 was retracted.

Contact 46CR1 closes to provide a holding circuit for GAGE ON & OFF relay 46CR through contact 35CR2.

Contact 46CR2 closes to provide a holding circuit with GAGE ON & OFF relay 46CR through normally closed contact 39CR2 and contact 30CR4 which closes during rapid infeed.

Contact 46CR3 closes to energize GAGE ON & OFF solenoid 20SOL which shifts a valve 107 to the left, as viewed in FIG. 7.

Hydraulic pressure is directed by the pump 92 to the valve 107 through lines 93 and 108, and a line 110 directs pressure to the head end of the hydraulic motor 38 which moves the piston rod 37 to the right, as again viewed in FIG. 7, which near horizontal direction as the arms 35, 36 are pivoted. The probe or sensing element 86 is thus brought into contact with the workpiece W with its center line passing through or near the axis of the workpiece W, irrespective of the particular diameter thereof, as indicated by a second workpiece W' in phantom outline in FIG. 3. This occurs because of the longer length of the arm 36 as compared to the arm 35 which brings the center shoe portions 84, 85 into contact with the workpiece W at equal arcuate distance from the point of contact of the probe 86 against the workpiece W. At this time the gage mechanism 20 is in position to perform a "qualifying" function to determine the unground dimension of the workpiece in comparison to a preset dimension of a card in the card reader 201, modified by the offset signal which is provided, via the wiring 221, to the digital to analog converter 202 which processes the data provided from the card reader 201 via the wiring 210.

A conventional summing network 203 (FIG. 8) receives a signal from the probe 86 of the caliper 26, as well as a size signal, modified to provide offset, from the digital to analog converter 202. The output of the summing network 203 is fed to a coarse meter 213 which produces a signal to indicate whether or not the portion to be ground is within the rough size tolerance for a particular oversize diameter of the workpiece W which is to be ground. When the diameter to be ground is within the diameter is "qualified" or approved and a signal closes a normally open contact QR (FIG. 9) to energize QUALIFICATION relay 48CR through normally closed contact 41CR2.

Contact 48CR1 closes to energize INFEED relay 30CR through normally closed WHEELHEAD OUT limit switch 6LS, contact 29CR1 and normally closed contact 50CR1 to effect further movement of the wheel support or wheel head 29 and the grinding wheel 17 carried thereby toward the workpiece W to begin Contact 30CR1 is grinding cycle.

Contact 30 CR 1 is closed to provide a holding circuit with INFEED relay 30CR. Contact 30CR2 is closed to energize INFEED solenoid 14SOL which advances the wheel head 29 and the grinding wheel 17 carried thereby.

Normally closed contacts 30CR5 and 30CR6 open to deenergize relay 7CR or 8CR and solenoid 4SOL or 5SOL is deenergized which moves the GAGE SHift valve 90 (fig. 7) to the inoperable or central position. Hydraulic pressure to the cylinder 51 is eliminated and the air valve 54 or 55 is reset by the spring 60 or 61, respectively, to reset said valve and to position the gage mechanism 20, to provide clearance between the side of the shoulder and the side of the caliper 26 adjacent thereto.

The forward movement of the wheel support or wheel head 29 opens wheel head BACK limit switch 8LS which was held closed when the wheel support or wheel head 29 was retracted against a solid stop by hydraulic pressure.

Wheelhead back relay 35CR is deenergized as the wheel head 29 is advanced.

Contact 35CR3 is opened which deenergizes GAGE ON relay 39CR and caliper 26 is retracted from the workpiece W.

If the dimension of the portion to be ground is too large and outside the qualifying range indicated by the circuitry of FIG. 8, the gage contact QR will not be closed and the QUALIFICATION relay 48CR will not be energized. The wheel head 29 will therefore not be advanced as contact 48CR1 of the INFEED circuit will remain open.

If the dimension of the unground portion of the workpiece W to be ground is undersize, the caliper 26 provides a signal which is combined in the manner heretofore described with the signal from the card reader 201 and this comparison signal is received by a fine meter 217 (FIG. 8) which, in turn, produces a size signal to close contact SR to energize ON SIZE relay 50CR.

Normally closed contact 50CR1 is opened to prevent INFEED RELAY 30CR from being energized.

When the unground workpiece is at size or undersize, the wheel support or wheel head 29 is not advanced as QUALIFICATION relay 48CR is never energized. Therefore, contact 48CR1 is never closed to energize INFEED relay 30CR except upon the closing of the contact QR in the manner heretofore described.

The caliper 26 is advanced during the grinding operation when a GAGE ON cam (not shown) on hand wheel 15 opens a limit switch contact 9LS1. The GAGE ON relay 39CR is deenergized and wheel head 29 is retracted.

Limit switch contact 9LS2 is closed to complete a circuit to energize the GAGE ON & OFF relay 46CR through contact 30CR4.

Contact 46CR2 closes to provide a holding circuit with the GAGE ON & OFF relay 46CR through closed contacts 39CR2 and 30CR4. Contact 46CR3 is closed to energize GAGE ON & OFF solenoid 20SOL which shifts the valve 107 to the left (FIG. 7).

Fluid pressure is then directed from the valve 107 to the head end of the cylinder 38 through the line 110 causing the piston rod 37 to advance to the right as viewed in FIG. 7 to again position the caliper 26 and the probe 86 onto the workpiece W.

During the remaining portion of the grinding operation the probe 86 sends a continuously changing signal corresponding to the change in the dimension of the workpiece W to the summing network 203. The specific construction of the probe 86 and a transducer associated therewith which may be used in machine tools using the present invention is fully disclosed in commonly assigned application Ser. No. 824, 433, filed May 14, 1969, in the name of Kurt M. Gebel, which was abandoned in favor of a continuation application filed Sept. 8, 1971. It is to be understood, however, that the invention may be used with probes and transducers of different construction.

The summing network 203 also receives a signal from the card reader 201, as heretofore described, or from conventional manual dial switches 111 when the card reader 201 is not used. The summing network 203 represents the desired finished dimension of the particular workpiece portion being ground modified in accordance with the setting of the analog size offset circuit 220.

The progress of the grinding operation is shown respectively on the coarse and fine meters 213 and 217, which are arranged in series to visually show when the diameter is at finish size.

A near size signal from the gage mechanism 20 through the fine meter 217 closes a contact NSR to energize NEAR SIZE relay 49CR. A normally closed contact (not shown) from relay 49CR opens to deenergize the increment feed, and spark out is then effected until ON SIZE contact SR is closed from the gage mechanism 20 to energize the ON SIZE relay 50CR.

The normally closed contact 50CR1 is opened which energizes INFEED relay 30CR to retract the grinding wheel 17 by retraction of the wheel support or wheel head 29.

The operation of the grinding machine 10 and the gage mechanism 30CR associated therewith is continually repeated in the manner heretofore described until each of the workpiece W portions A through E 20 been qualified and have been ground to a predetermined oversize, or until such time that prior to grinding one of the portions a qualification signal is not received from the circuit of FIG. 8 and the grinding operation is terminated by the prevention of wheel head 29 advancement.

The actual diameter of the workpiece W portions A through E are then independently determined. Each of the workpiece W portions A through E are expected to be oversize because of the previous setting of the analog size offset circuit 220. If in fact, one or more of the workpiece grinding portions A through E is not oversize, possible further adjustments of the contacts K1–K8 and K1'–K8' is indicated so as to add additional resistance to the arm constituted by the precision resistors R1–R9 and simultaneously deleting resistance from the arm constituted by the precision resistors R1'–R9. In most instances, however, particularly when an operator has had experience with similar workpieces, all of the workpiece W portions A through E will be oversize; however, the portions A through E will not all be exactly oversize by the same amount.

Thumbwheel switches 230 are then adjusted so as to provide appropriate digital signals to the wiring 232 in response to enabling signals which appear on each of the leads 225–229 from the program sequence controller 200, which provides, contemporaneously with the appearance of an enable signal on each of the leads 225–229, a grinding signal for each of the workpiece W portions A through E, respectively. It is accordingly, clear that the thumbwheel switches 230 can each be set to provide specific digital signals on the output wiring 232 to the digital to analog converter 223 which are converted therein and appear as an analog signal on the wiring 222 thus modifying the current flow in the resistive network of the analog size offset circuit 220. In effect, the output from the digital to analog converter 223 is connected in series with the two voltage sources 237 and 238. As thus far described, the digital to analog converter 223 will provide modification of the output from the analog size offset circuit 220 which appears on the wiring 221 of a given polarity or direction. The thumbwheel switches 230 are each individually set by an operator to a particular value corresponding to the amount each of the workpiece W portions A through E differs in its oversize from that desired by the setting of the resistive network within the analog size offset circuit 220.

As thus far described, the setting of the thumbwheel switches 230 serve to provide for the appearance of digital signals on the wiring 232 which, when converted to analog signals within the digital to analog converter 223 and appear on the wiring 222, serve to provide additional positive offset since the output from the digital to analog converter 223 is of a given polarity. Since some of the workpiece W portions A through E may be too large instead of too small, it is desirable to provide for the appearance of an enable signal on the lead 235 which will serve to reverse the output from the digital to analog converter 223 in the event a programmed negative offset is desired for any particular diameter. To accomplish the reversal of the output from the digital to analog converter 223, individual ones of the single-pole single-throw switches 234 are closed so as to provide selectively a plurality reversing enable signals on the wiring 222 upon the appearance of an enable signal on any of the leads 225-229 during the grinding of workpiece portions A through E, respectively.

The switches 240 and 242 are opened so as to open both the contact 241 and the contact 243 and additionally the toggle switches (not illustrated) associated with the contacts K1–K8 are positioned so that the contacts are opened and closed as shown in FIG. 10 thereby establishing the analog size offset circuit 220 in its initial condition. In such a condition, the circuitry of the present invention will respond to a program and grind the workpiece W portions A through E exactly to the programmed size since a modifying programmed offset signal is processed through the analog size offset circuit 220 from the digital to small converter 223 without any additional common offset or oversize being provided. During the remaining portion of the grinding operation the probe 86 sends a continuously changing signal corresponding to the change in dimension of the workpiece W to the summing network 203 which receives an additional analog signal from the digital to analog converter 202 in accordance with firstly the output from the card reader 201 and secondly in accordance with the output from the digital to analog converter 223 which supplies specific and distinct offset signals during the grinding of each of the workpiece portions A through E to take into account the different flexural characteristics processed the workpiece W portions A through E being ground.

It will be appreciated by those skilled in the art that the thumbwheel switches 230 and the single-pole single-throw switches 234 may be manipulated to provide for grinding individual workpieces W or individual workpiece W portions A through E a predetermined amount oversize or undersize without changing or modifying the card within the card reader 201. Furthermore, the thumbwheel switches 230 and the single-pole single-throw switches 234 may be utilized to correct patterns of size irregularities which may occur during an extended period of time without changing or modifying the card within the card reader 201.

While preferred forms and arrangements of parts have been shown in the thumbwheel invention, it is to be clearly understood that various changes in details and arrangement of parts may be made without departing from the spirit and scope of this invention as defined in the appended claims.

What is claimed is:
1. In a grinding machine,
 a. a bed,
 b. a workpiece support on said bed having means for supporting a workpiece,
 c. a workpiece wheel support,
 d. means for effecting relative transverse movement of said supports,
 e. gage means positionable to engage portions of a workpiece to be ground and including means for generating a size signal indicative of the size of that portion of a workpiece with which engagement is made,
 f. means for providing signals indicative of desired sizes for said portions of a workpiece,
 g. means for providing individual offset signals for each of said portions of a workpiece, and
 h. means responsive to said size signal, said signals indicative of desired sizes for said portions of a workpiece and said individual offset signals for each of said portions of a workpiece for controlling said means for effecting relative transverse movement of said supports.

2. A grinding machine according to claim 1, wherein said means for providing individual offset signals for each of said portions of a workpiece is adjustable to provide an individually adjustable offset signal for each of said portions of a workpiece.

3. A grinding machine according to claim 1, wherein said means for providing individual offset signals for each of said portions of a workpiece is operative to provide for grinding each of said portions of a workpiece a preselected amount of oversize.

4. A grinding machine according to claim 1, wherein said means for providing individual offset signals includes a first means for providing a first predetermined common offset signal, a second means for providing an individual second offset signal during grinding of each of said portions of a workpiece, and means for combining said first predetermined common offset signal and each individual second offset signal to establish said individual offset signals.

5. A grinding machine according to claim 4, wherein said first means is selectively operable to remove said first predetermined common offset signal whereby only each of the individual second offset signals provide offset.

6. A grinding machine according to claim 4, wherein said second means for providing an individual offset signal is adjustable for providing differing amounts of offset for said portions of a workpiece.

7. A grinding machine according to claim 6, wherein said second means for providing an individual offset signal includes means for selectively reversing the direction of offset for each of said portions of a workpiece.

8. A grinding machine according to claim 1, wherein said means for providing individual offset signals for each of said portions of a workpiece is adjustable for providing differing amounts of offset for said portions of a workpiece.

9. A grinding machine according to claim 8, wherein said means for providing individual offset signals for each of said portions of a workpiece includes means for selectively reversing the direction of offset for each of said portions of a workpiece.

10. A grinding machine according to claim 1, wherein said means for providing individual offset signals comprise a digital to analog converter, means coupled to said digital to analog converter for providing predetermined digital signals thereto corresponding respectively to desired offset for each of said portions of a workpiece, and an analog size offset circuit coupled to receive an output from said digital to analog converter.

11. A grinding machine according to claim 10, including a second digital to analog converter, said second digital to analog converter having a first input coupled to said means for providing signals indicative of desired sizes for said portions of a workpiece, the last said means being operative to provide digital signals indicative of the desired sizes for said portions of a workpiece; said second digital to analog converter having a second input coupled to receive an output from said analog size offset circuit for modifying an analog output signal from said second digital to analog converter; and a summing network coupled to said second digital to analog converter for receiving said analog output therefrom and to said gage means for receiving the size signals therefrom, said summing network having an output coupled to said means for effecting relative transverse movement of said supports.

12. A grinding machine according to claim 11, wherein the output from said summing network is coupled to means for producing qualifying signals and on size signals.

13. A grinding machine according to claim 12, wherein said means for producing qualifying signals and on size signals include meter means.

14. A grinding machine according to claim 13, wherein said meter means comprise a meter for indicating coarse dimensions and a meter for indicating fine dimensions.

15. A grinding machine according to claim 10, wherein said analog size offset circuit includes means for providing a common offset signal and for processing said output from said digital to analog converter.

16. A grinding machine according to claim 15, wherein said means for providing a common offset signal is adjustable whereby the common offset signal may be reduced to zero.

17. In a machine tool,
a. means for effecting relative movement between a tool support and a work support of a machine tool in order to control stock removal from a workpiece carried by the work support,
b. means for controlling said means for effecting relative movement including program means for providing a plurality of distinct relative movements of said tool support and said work support during a machine operation, and
c. offset means coupled to said means for controlling including means for automatically providing thereto individual offset signals for each of said distinct relative movements whereby an individual amount of offset may be provided during each of said distinct relative movements between said tool support and said work support.

18. A machine tool according to claim 17, wherein said offset means is adjustable for providing individually adjustable offset signals.

19. A machine tool according to claim 17, wherein said offset means includes a first means for providing a first predetermined common offset signal, a second means for providing an individual second offset signal during each of said distinct relative movements and means for combining said first predetermined common offset signal and each individual second offset signal to establish said individual offset signals.

20. A machine tool according to claim 19, wherein said first means is selectively operable to remove said first predetermined common offset signal whereby only each of the individual offset signals provide offset.

21. A machine tool according to claim 17, including means for selectively reversing the direction of offset for each distinct relative movement.

* * * * *